Patented June 24, 1947

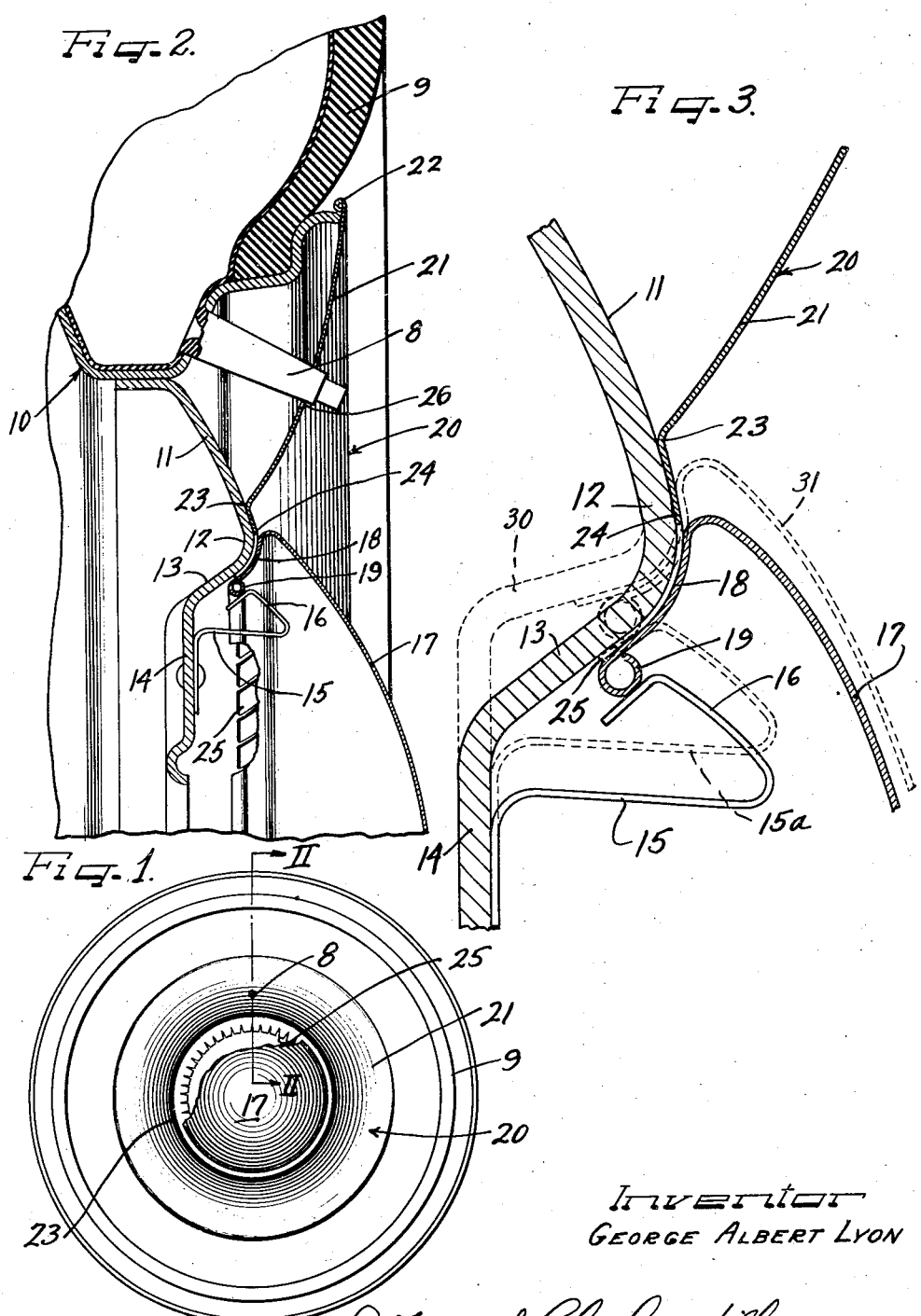

2,422,690

UNITED STATES PATENT OFFICE 2,422,690

VEHICLE WHEEL COVER

George Albert Lyon, Allenhurst, N. J.

Application May 12, 1945, Serial No. 593,477

1 Claim. (Cl. 301—37)

This invention relates to a wheel structure and more particularly to a wheel cover which will accommodate slight variations in the size of a hub cap cooperating therewith.

An object of this invention is to provide an improved wheel cover which will in itself resiliently accommodate variations in size of the hub cap within a limited range, whereby a single size of cover can be used with a number of different sized or shaped wheels.

A further object of this invention is to provide a cover which will more readily self-adjust and fit itself to the wheel.

In accordance with the general features of this invention there is provided in a wheel cover structure for a wheel including a tire rim part and a body part having a dished central hub cap receiving portion and retaining means therefor, a wheel cover cooperable with an outer side of the wheel and comprising an annulus having an inner margin turned generally axially rearwardly for telescoping cooperation with the dished portion and a hub cap held in the wheel by the retaining means, said inner margin being serrated and resiliently deflectible by the portion of the hub cap engaged thereby to self-adjust itself to variations in size and shape of the hub cap.

Other objects and features of this invention will more fully appear from the following detail description taken in connection with the accompanying drawings which illustrate a single embodiment thereof and in which Figure 1 is a side view of a wheel showing my cover assembly applied thereto and partly broken away to show the contour of the inner margin of the annular cover;

Figure 2 is an enlarged fragmentary cross-sectional view taken on the line II—II of Figure 1 looking in the direction indicated by the arrows; and Figure 3 is a fragmentary sectional view similar to a portion of Figure 2 but illustrating diagrammatically by dotted lines how the inner margin of the cover can self-accommodate or adjust for variations in size and contour of the skirt of the hub cap.

As shown on the drawing:

In Figure 2 I have illustrated a conventional pneumatic tire and tube designated generally by the reference character 9 and being supported in the usual way by a multi-flange drop center type of tire rim 10. The tire rim is supported upon a body or load bearing part 11 which includes a central dished nose portion 12 and an inwardly depressed hub cap receiving portion 13 which terminates in a generally radially extending bolt-on flange 14 adapted to be bolted in the usual way by cap screws or bolts (not shown) to a part on a vehicle such for example as a brake drum.

The bolt-on flange 14 carries in the usual way a plurality of spaced hub cap retaining spring clips 15 which may be of any suitable number such, for example, as three to five. These clips are of a type known to the trade as an inverted spring clip due to the fact that each of them has its free extremity 16 turned back upon itself so as to be resiliently and deflectibly cooperable with an inner edge of a hub cap. In other words, the edge 19 of the hub cap 17 is adapted to be cammed over and behind the turned extremities 16 of the clips for the purpose of being clamped in a detachable manner to the wheel.

The hub cap 17 comprises a dished metallic stamping having an under turned skirt 18 which terminates in the previously referred to turned or rolled inner edge 19 of the hub cap.

The structure thus far described is more or less of a standard nature in the automobile industry and is fully disclosed in numerous previous patents that have been granted to me.

Cooperable with this wheel assembly is a wheel cover designated generally by the reference character 20 embracing the features of this invention. This wheel cover may be made of any suitable material such, for example, as resilient sheet metal or even a suitable resiliently pliable plastic material such, for example, as ethyl cellulose. I preferably, however, make it of a steel sheet such as stainless steel sheeting. It may be stamped by suitable dies in a conventional press equipment.

The annular cover 20 includes an annular portion 21 which extends radially and axially inwardly from an outer turned edge 22 to a turned portion 23 adapted to bear on the wheel body part. The outer turned edge 22 is so formed as to bear against and overhang the outer edge of one of the flanges of the rim part 10.

The inner portion of the annulus 20 is turned slightly outwardly at 24 around the nose 12 of the body part 11 and then axially and radially rearwardly into the interior of the depressed portion 13 of the body part. Thus, the inner margin of the annulus closely conforms with the central dished portion of the body part.

In addition, the inner margin of the cover 20 is serrated or slotted to provide a plurality of resilient fingers 25 which greatly enhance the deflectible characteristic of the inner margin of the annulus.

It will be perceived that the portion 21 of the cover by reason of its radial extent, contour and close proximity to the side wall of the tire will appear in use to be a continuation thereof. In fact, if the portion 21 is given a white external finish it will, in use on the wheel, appear to constitute a white side wall part of the tire.

In addition it will be noted that the portion 21 may be provided with an opening 26 for accommodating the valve stem 8 so that access may be had to the valve stem without necessitating removal of the cover from the wheel.

In the application of the cover to the wheel, it is first placed over the wheel and the hole 26 is aligned with the free end of the valve stem 8 so that the valve stem can project therethrough. When in this position the serrated or fingered margin 25 of the cover may be slightly spaced from the depressed portion 13 of the body part of the wheel. Thereafter the hub cap is placed over the center of the wheel and is pressed home into retaining cooperation with the free extremities 16 of the spring clips 15. During this application of the hub cap to the wheel it deflects or flexes the inner margin of the cover into tight retained cooperation with the body part of the wheel. This retained cooperation is clearly shown in Figure 3 of the drawing.

Now should the cover 20 of my invention be used with a wheel body part having a larger hub cap opening such as that designated by the dotted lines 30 in Figure 3, it will of course be evident that a hub cap having a larger diameter of skirt will have to be used. I have illustrated such a larger size of hub cap by the dotted lines designated generally by the refernce numeral 31 in Figure 3. It will be noted that this hub cap 31 has a substantially larger skirt than the hub cap 17. In addition, the spring clips 15a, shown by dotted lines in Figure 3, would be positioned further radially outwardly and would be located radially outwardly of the clips 15.

With such a modified form of wheel structure shown by the dotted lines in Figure 3 the same wheel cover 20 may still be used with the same by reason of the fact that the inner serrated margin 25 of the cover can be flexed to conform to the shape of the skirt of the hub cap and to tightly bear against the depressed portion 30 of the larger depressed portion of the wheel. In this manner my novel wheel cover 20 can accommodate within a limited range a variation of sizes of hub caps without change. This is a distinct advantage since by using the same size of wheel cover for a limited range of sizes of hub caps and wheels it is feasible to materially reduce the cost of manufacture, particularly with reference to the cost of dies. Irrespective however of the size of the wheel body part or hub cap with which the cover 20 is in cooperation, the cover still has a tight fit with the wheel parts and in fact bears tightly under tension in engagement with at least two points of the wheel, one at the outer edge of the rim part and one at the body part of the wheel. Thus the cover has a tight anti-rattle fit on the wheel.

I claim as follows:

In a cover structure for a wheel including tire rim and body parts and a central detachable hub cap, wherein the body part is formed with a rounded dished nose portion and the hub cap cooperates with the axially outer extremity and adjacent radially inner area of the nose portion, a cover member cooperable with the outer side of the wheel and comprising an annulus extending generally radially inwardly and axially rearwardly from an outer edge of the rim to a point of bearing on the nose portion spaced substantially axially inwardly and radially outwardly of the nose extremity and being of such configuration as to appear in use to be a continuation of the side wall of the tire such that the tire appears to extend to substantially the nose of the body part, said cover annulus having a concave-convex annular inner marginal portion extending from said point of bearing axially outwardly and radially inwardly and then generally axially inwardly and generally conforming for nested engagement with said nose portion, the axially inner portion of said margin being radially slotted to divide the same into resilient fingers adapted for resilient deflection to accommodate variations in the internal diameter of said nose portion and in the size of the hub cap so as to be pressed into engagement with said nose portion by the hub cap when assembled therewith.

GEORGE ALBERT LYON.